(No Model.)
G. WIEMERS.
CAR FENDER.
No. 596,196.    Patented Dec. 28, 1897.
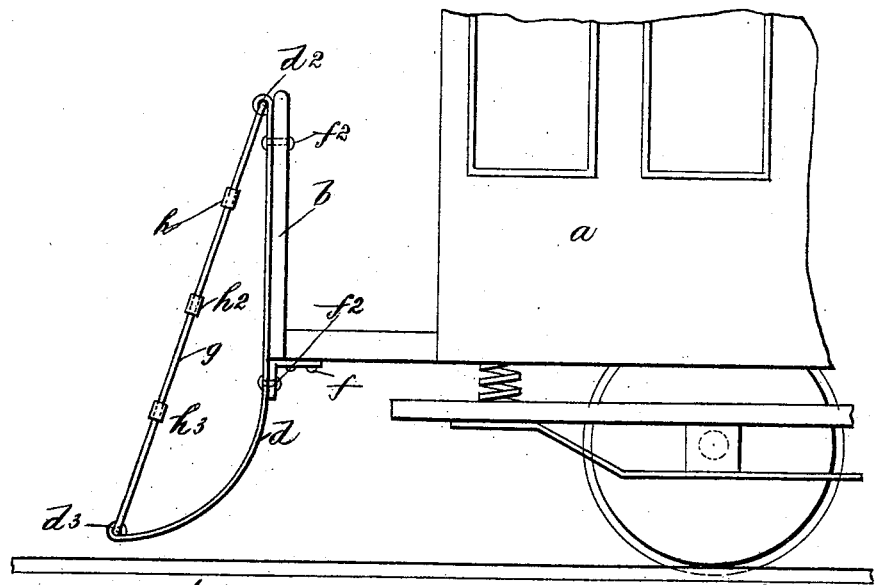
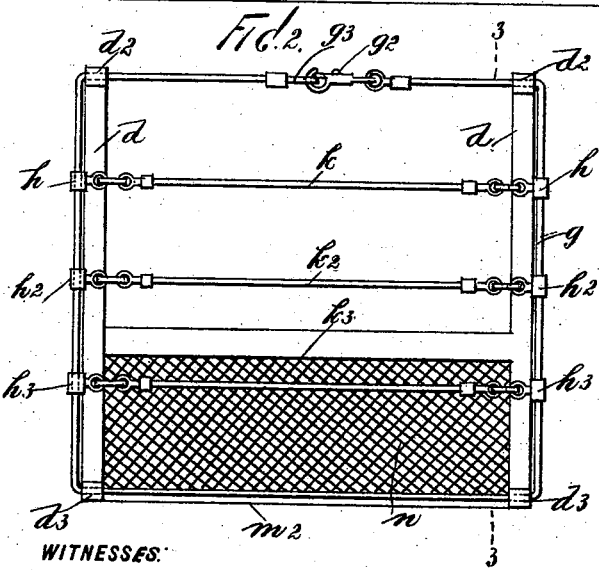
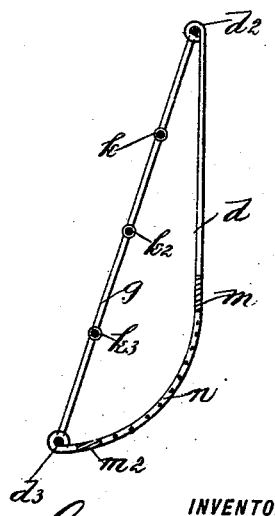
WITNESSES:
INVENTOR
George Wiemers
BY
Edgar Tate & Co.
ATTORNEYS.

UNITED STATES PATENT OFFICE.

GEORGE WIEMERS, OF BROOKLYN, NEW YORK.

CAR-FENDER.

SPECIFICATION forming part of Letters Patent No. 596,196, dated December 28, 1897.

Application filed August 31, 1897. Serial No. 650,172. (No model.)

*To all whom it may concern:*

Be it known that I, GEORGE WIEMERS, a citizen of the United States, residing at Brooklyn in the county of Kings and State of New York, have invented certain new and useful Improvements in Car-Fenders, of which the following is a full and complete specification, such as will enable those skilled in the art to which it appertains to make and use the same.

This invention relates to car-fenders, and more particularly to that class thereof which is particularly adapted for use on electric-motor cars.

In the above-described class of car-fenders it has been found in actual use that when the contacting surfaces of the fender come in collision with the object to be removed from its dangerous position in front of the car the tendency of the fender is to throw said object and permit of its escaping between the fender and the truck of the car.

The object of the invention is to provide a fender whose contacting surface will be sufficiently resilient to overcome the first jar of the collision, and instead of throwing the object violently to the track permit of its being thrown into the fender itself, and also permit an action which would admit of a person using the upper cross-bands to prevent his being thrown under the car.

A further object of the invention is to provide a fender which will be simple in construction, effective in operation, and so constructed and arranged as to be inexpensive to manufacture.

The invention consists in those novel features of construction hereinafter set forth and described, and more particularly pointed out in the claims hereto appended.

Referring to the accompanying drawings, which form a part of this specification, Figure 1 is a side elevation of my improved fender shown attached to the dashboard of a car; Fig. 2, a front elevation of said fender; Fig. 3, a section on the line 3 3 of Fig. 2; and Fig. 4 shows a modification in means of attachment.

Like letters refer to like parts throughout the several views.

In the accompanying drawings is shown at $a$ the body of a car to the dash or tail board $b$ of which the fender is designed to be attached by means of rods $d$ $d$. The rods are preferably flat in construction and are secured to the said dash or tail board and to an angle-iron $f$, secured to the lower portion of the platform of the car, by means of bolts or rivets $f^2$.

The rods $d$ at each extremity thereof are provided with eyelets $d^2$ $d^3$, which are sufficiently large to accommodate the material of which the protecting body of the fender consists. Supported by the eyelets $d^2$ $d^3$ is a suitable flexible band $g$, preferably composed of rope, which is threaded through said eyelets and secured at the top of the fender by a suitable fastening device, preferably an eyelet $g^3$ and a coöperating spring-hook $g^2$, attached to the ends of said rope, respectively. This rope or band has mounted thereon, at suitable distances apart between the eyelets $d^2$ and $d^3$, collars $h$, $h^2$, and $h^3$, which support suitable eyelets, by means of which cross-bars $k$, $k^2$, and $k^3$ are attached to the flexible frame $g$ of the fender. The bands $k$, $k^2$, and $k^3$ are similarly constructed as the band $g$, and in the accompanying drawings are shown as attached thereto by means of spring-hooks, whereby they are rendered readily removable in order to facilitate the substitution for old cross-bars material of sufficient strength to avoid accidents.

The rods $d$ at the lower extremity curve forward slightly, so as to protrude sufficiently before the car, and in this location are provided with connecting-rods $m$ $m^2$, which serve as supports for a platform $n$, forming an auxiliary fender designed to prevent objects from passing under the car if by chance they should pass between the cross-bands $k$ $k^2$ $k^3$.

It is to be observed that the bands $g$, $k$, $k^2$, and $k^3$ may be covered with canvas, leather, or other suitable material to prevent undue wear thereof and that the lower extremity of the rods $d$ may also be padded. The cross-bands $k$, $k^2$, and $k^3$ may be multiplied indefinitely without departing from the spirit of my invention.

In the modification shown in Fig. 4 at $d^4$ is shown a hook attached to or made integral with each of the rods $d$, by means of which the fender may be attached to the dashboard of the car when it is desired to use only one fender on each car, transferring that from one end of the car to the other at the end of each trip.

The construction of my improved car-fender in so far as has not already been described is as follows: The rods $d$ are brought in the proper relation with the dashboard $b$ and the angle-iron $f$ secured to the lower portion of the platform and permanently secured in such relation by means of bolts or rivets $f$ $f^2$. The band $g$, forming a resilient flexible frame for the fender, is then threaded through the eyelet $d^2$ and $d^3$ in each of said rods, and at the top of the fender the ends of said band are secured by means of the hook $g^2$ and the eyelet $g^3$. The collars $h$, $h^2$, and $h^3$ are mounted on said rope at any convenient period of said threading process and the cross-bands $k$, $k^2$, and $k^3$, secured to said collars and said frame by means of the eyelets on said collars and a coöperating device, the spring-hook shown in the drawings attached to the ends of said cross-bands. The auxiliary fender $n$ is composed of netting firmly attached to the bars $d$ and the cross-bars $m$ $m^2$, connecting the lower extremity of said bars.

The construction of the device shown in the modification Fig. 4 is identical to that of the preferred form of the invention excepting that it is secured to the dashboard by means of the hooks $b^4$ instead of by the rivets $f^2$, as shown and described in connection with the preferred form of invention.

It will readily be observed from the above description that the band $g$ forms a flexible resilient frame for a fender, upon which is secured removable cross-bars of equal flexibility and resiliency, thus producing a fender which will guard against those accidents which result from the rigidity of the contacting surfaces of the protecting devices for motor-cars of all descriptions.

In operation my improved fender acts as follows: When the car-fender comes in collision with an object in the course of the moving vehicle, the flexibility and resiliency of the lower portion of the frame will, as aforesaid, avoid the first great jar of the collision and thus avoid the disastrous result of a dead blow and at the same time prevent said object from being thrown beneath the fender by the rigidity of the same. If the object be of sufficiently small dimensions to pass beneath the lower cross-bands, the auxiliary fender $n$ will prevent said object passing underneath the car between the supporting-rods $d$. The lower portion of the frame $g$ will act in all instances similarly. The lower portion of the rods $d$, as aforesaid, may also be padded in order to present a flexible surface throughout the entire contacting surfaces of the said fender.

By the means above described it will readily be observed that I have attained the object of the invention, having produced a fender the contacting surfaces of which will be sufficiently resilient to overcome the first jar of the collision, thus permitting the object to be thrown into the fender itself instead of being thrown violently to the track, where it would be inclined to pass under the car. The slight protrusion of the fender will also admit of the grasping of the cross-bands by any person whom the fender may strike, thus permitting an action which would prevent a person being thrown down by the contact with the fender of the moving vehicle.

As aforesaid, the removability of the cross-bands will admit of a speedy substitution for broken or worn-out cross-bands of cross-bands of greater strength without necessity for the complete disintegration of the entire erected structure or the necessity for the employment of skilled labor to effect the change.

It is to be observed that there may be many variations in minor details of construction without departing from the spirit and scope of my invention.

Having fully described my invention, I claim as new and desire to secure by Letters Patent—

1. In a car-fender, the combination with a rectangular frame, comprised of a resilient band, and means whereby its ends are united, of removable resilient cross-bands supported thereby, and means whereby said frame may be attached to the car, substantially as described.

2. In a car-fender, the combination with a rectangular frame comprised of a resilient band, and means whereby its ends are detachably united, of removable resilient cross-bands supported thereby, rods attached to the car, and eyelets supported by said rods, said resilient frame being supported by said rods, by being passed through said eyelets, substantially as described.

3. In a car-fender, the combination with a resilient frame, of rods attached to the car, and adapted to support said frame, an auxiliary fender supported by the lower portions of said rod, and resilient removable cross-bands, substantially as shown and described.

4. In a car-fender, the combination with a resilient frame, of rods attached to the car having eyelets by means of which said frame is supported, an auxiliary fender supported by the lower portions of said rods, and resilient removable cross-bands supported by said frame, substantially as shown and described.

In testimony that I claim the foregoing as my invention I have signed my name, in presence of the subscribing witnesses, this 27th day of August, 1897.

GEORGE WIEMERS.

Witnesses:
C. VORDFORS,
H. M. VALENTINE.